UNITED STATES PATENT OFFICE.

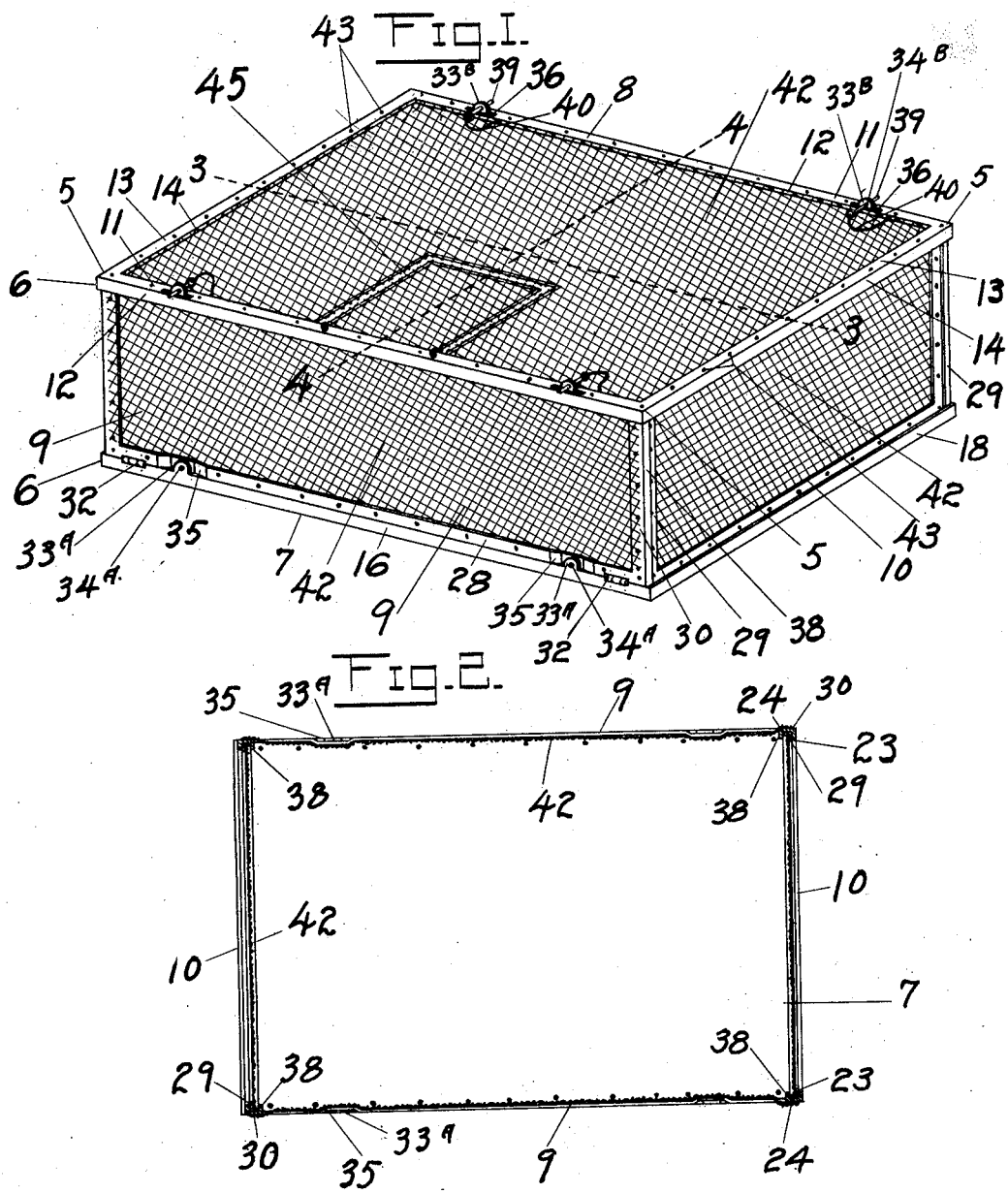

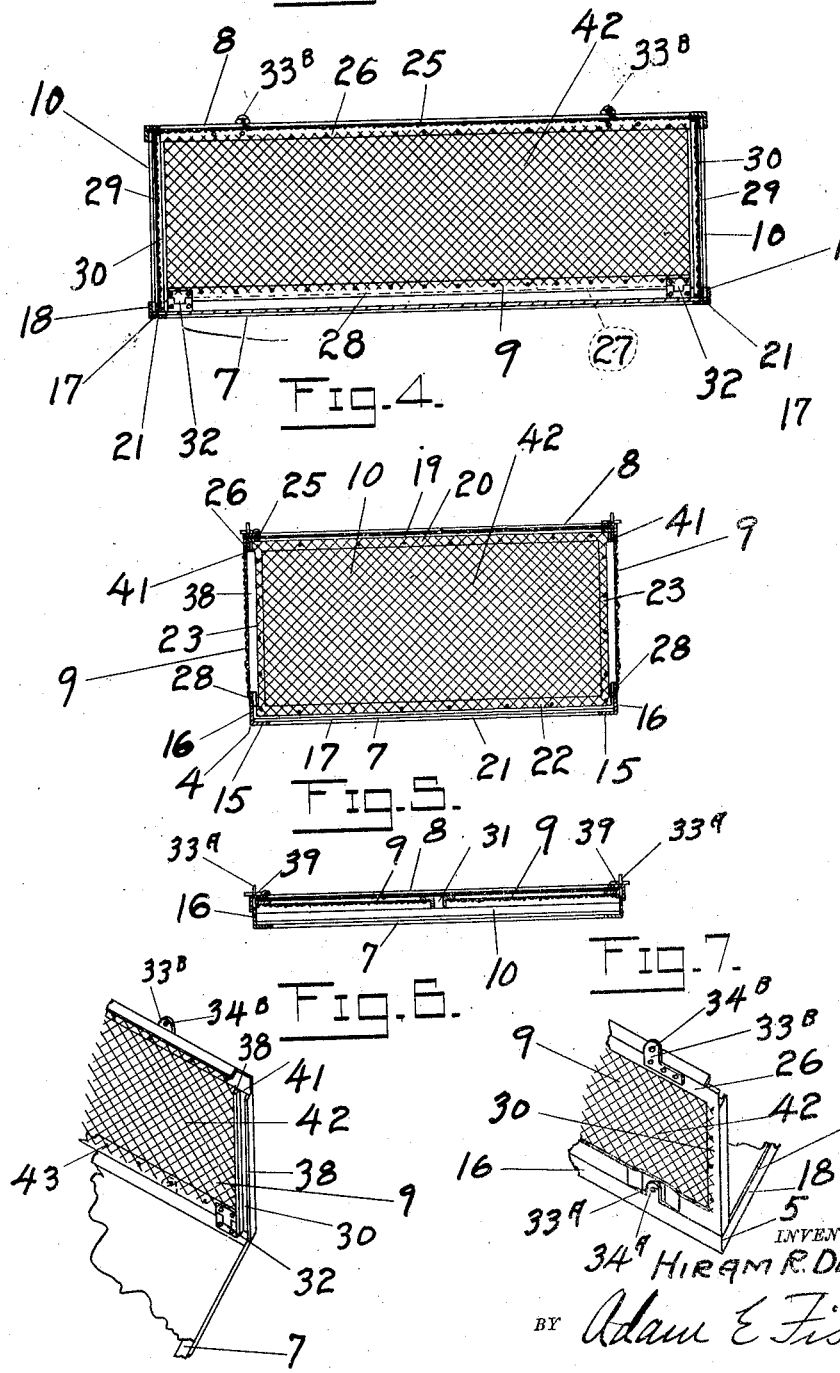

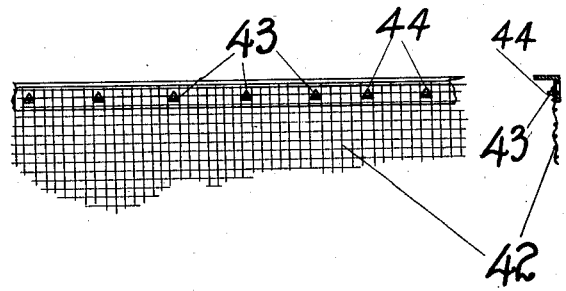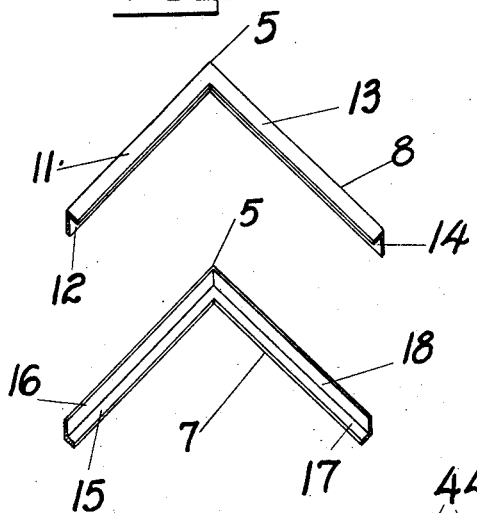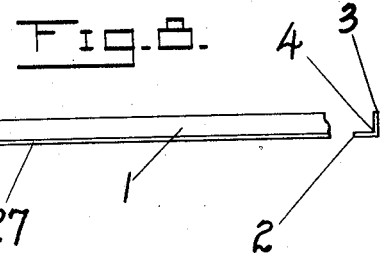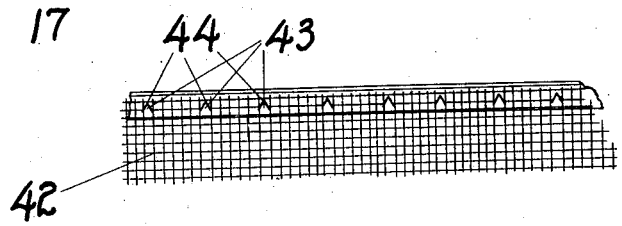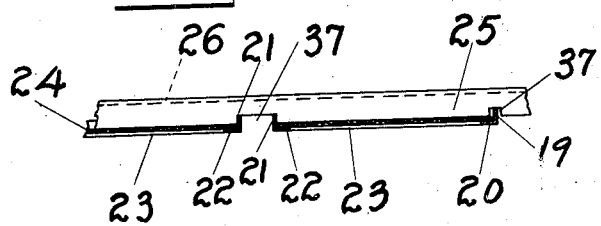

HIRAM R. DE LAYE, OF ST. LOUIS, MISSOURI.

FOLDING CRATE.

1,369,402.

Specification of Letters Patent.   Patented Feb. 22, 1921.

Application filed June 5, 1919, Serial No. 301,923.   Renewed October 15, 1920.   Serial No. 417,278.

*To all whom it may concern:*

Be it known that I, HIRAM R. DE LAYE, a citizen of the United States, residing in the city of St. Louis and State of Missouri, have invented new and useful Improvements in Folding Crates, of which the following is a specification, reference being had to the accompanying drawings.

The present invention pertains to collapsible crates, and the main object is to produce a shipping crate for general use in shipping poultry, produce and the like, the elements whereof may be readily expanded or set up for the purpose of receiving its load and rigidly locked in that position; and the elements whereof may be likewise readily knocked down and collapsed, and folded upon the bottom thereof, and locked in that position in very small space as compared to the crate in its expanded position, and so that the knocked-down crates may be reshipped at a comparatively small expense.

Another object is to provide a crate so that each section will form and act as a brace to the other sections when in set up position, the end pieces acting as braces against the side pieces pushing inwardly, and the top flanges of the cover acting as stops against the side and end pieces pushing outwardly.

Another object is to produce a create embodying a handy means for inserting wire screening or netting into the frames by punching ears from the rails, so that the borders of the wire netting can be either hooked over the ears, and the ears then bent back flush, or said netting can be secured to said ears by other means.

Another object is to produce a crate which may be piled one atop of another without damage and which will maintain a stable equilibrium when so loaded or set one upon another either in expanded or collapsed form.

Another object is to produce the crate in such form that the side elements thereof may be held in upright position even though the top is removed, this for the purpose of facilitating the packing of the crate.

With these and other objects in view, attention is called to the accompanying drawings.

Figure 1 is a perspective view of the set up or expanded crate;

Fig. 2 is an inside view of the bottom frame showing a solid bottom board attached thereto;

Fig. 3 is a vertical longitudinal section of the expanded crate, on the line 3—3 in Fig. 1;

Fig. 4 is a similar transverse section, on the line 4—4 in Fig. 1;

Fig. 5 is a transverse section of the collapsed crate with the end frames lying flat upon the bottom frame, the side frames folded down, and the top frame locked down over all;

Fig. 6 is an inside perspective detail of a corner of the expanded crate showing sections of the bottom and one of the sides;

Fig. 7 is a similar outside perspective detail;

Fig. 8 is a detail of a strip of the angle iron before being bent to form one of the frames;

Fig. 9 is a perspective detail of a corner of the upper and lower frames;

Figs. 10 and 11 show a method of attaching the screening or netting to the frames;

Fig. 12 is a detail showing how the flanges of the side frames may be notched to fit over the flanges of the end frames for a more compact fold.

Referring more particularly to the drawings, as illustrating my preferred method of construction, my invention consists in the method of constructing from strips of angle iron 1, and assembling, rectangular frames to form a complete, six-faced collapsible crate, and said invention includes also the crate itself as so constructed.

The strips of angle iron embody two flanges 2 and 3 formed integrally and longitudinally at right angles, and thus forming the resulting trough 4. These strips are cut the proper length and are bent transversely to form the corner angles 5, the troughs 4 being turned inwardly. The meeting ends 6 are then welded or riveted together, thus completing the rectangular frames. Thus are formed the bottom frame 7, the similar top frame 8, the two similar side frames 9 and two similar end frames 10.

Assuming these frames to be now set up in their expanded positions to form the opened out crate, in order to locate the various flanges for descriptive purposes it may be said that the bottom and top frames 7 and 8 have each two horizontal side bars and two horizontal end bars, each set horizontally spaced apart and extended parallel each bar having a flange faced horizontally and a flange faced vertically, as indicated at 11, 12, 13, 14 and 15, 16, 17, 18 respectively; the end frames 10 have each two horizontal bars, vertically spaced apart and parallel, and two vertical, supporting bars horizontally spaced and parallel, the horizontal bars having each a flange faced horizontally and a flange faced vertically, and each vertical supporting bar having two flanges faced at right angles, as indicated at 19, 20, 21, 22 and 23, 24 respectively. The side frames 9 have flanges corresponding to the end frames 10, except that the lower horizontal flanges corresponding to 21 on the end frames, and which if left intact would be represented as 27, are cut away so as to enable said side frames to be hinged to the bottom frames without interference and as will be later described. Thus the side frames 9 are left each with an upper, horizontal bar having each a horizontally faced flange 25 and a vertically faced flange 26, a lower horizontal bar or vertically faced hinge strip 28, which corresponds to the flange 22 on the end frames 10, and two vertical supporting bars each having two flanges faced at right angles as indicated at 29, 30. All of the above mentioned flanges may also be referred to as stops in respect to their function of interlocking the elements together and bracing same against collapse when in expanded form.

The side frames 9 are of equal height and so that when folded down they will meet at a medial line 31, and as indicated they are hinged from their lower hinge strips 28 to the vertically faced side flanges 16 of the bottom frame 7, by means of four hinges 32 formed integrally or riveted or welded in place. Thus the side frames 9 may be readily opened to a vertical position or folded down upon the bottom. Upstanding lock-ears 33ª, pierced with eyes 34ª and mounted from the flanges 16, serve both as stops against the sides falling outwardly and as locks for locking the crate together in either its opened or closed position. Recesses 35 may be formed in the strips 28 to receive the lock-ears 33ª, and so allow the sides 9 to be raised to an exact vertical position. Complementary lock-ears 33ᵇ, likewise pierced with eyes 34ᵇ, are mounted upon the upper vertically faced flanges 26 of the side frames 9, in direct vertical alinement with the lock-ears 33ª. Four slots 36 are cut through the upper horizontally faced flanges 11 of the top frame 8, of a size to receive and adapted to register with said lock-ears 33ª and 33ᵇ. The side frames 9 are slightly less in length than the bottom and top frames, so that they will fall within the vertically faced end flanges 14 and 18 of the bottom and top frames. The end frames 10 are of equal height, and slightly more than the height of the side frames 9, for the reason that the end frames must extend down to the flanges 15 while the side frames are hinged above the flanges 15 to the top of the flanges 16. The end frames are also of a length adapted to fall within the said vertically faced flanges 16. Thus they may readily set up into position at the ends of the side frames 9, within the flanges 14, 18, 29, or may be laid down flat across the bottom frame 7, endwise upon the flanges 15 and within the flanges 16. In order that a perfectly flat fold may be had and that the flanges 19, 21, 23 of the end frames may not rise above the flanges 16, 18, of the bottom frame, a size of angle iron smaller in cross section is used for making said end frames. In such position, with the flanges 19, 21, 23 turned upwardly, the side frames 9 may be readily folded down upon the end frames 10, and for a more compact folding, notches 37 may be cut transversely through the upper flanges 25 of the side frames and adapted to receive the flanges 19 and 21 of the end frames as the side frames are folded down. Stops 38 may be mounted upon the flanges 30 of the side frames 9 and spaced from the flanges 29, so as to prevent the end frames 10 from falling inwardly.

When in folded or collapsed position as above described, the lock-ears 33ª pass through the slots 36 of the top frame, and cotter pins 39 are inserted through the eyes 34ª, thus locking the elements of the collapsed crate into compact form. Similarly, when expanded, the lock-ears 33ᵇ pass through the slots 36, and the cotter pins 39 passed through the eyes 34ᵇ lock the crate in its expanded form. Chains 40 connect the cotter pins 39 with the top frame 8 so that said pins will not become lost and will be always at hand ready for use.

If preferred, the bottom, horizontally faced side flange indicated at 27 may be left intact, as shown in the detail at Fig. 8. The extreme outer ends of the upper, horizontally faced flanges 25 of the side frames 9 may be cut away, thus leaving the open corners 41, through which to slide the end frames 10 down into position. Any suitable opening or door 45 may be provided to assist in loading the crate, but it is understood that one of the advantages of this crate is that the lock-ears 33ª will sustain the side and end frames in position even with the top frame removed for the purpose of loading.

A method of fastening wire screening or netting 42 to the frames is illustrated in Figs. 10 and 11 and consists in punching three-cornered ears 43 in the adjacent flanges of the several frames, so that the points of the ears 44 will extend contrary to the direction of the pull of the netting. The netting 42 is then stretched over these ears 43 and the ears are then pressed back flush with the flanges, thus locking the netting onto the frames. Of course, any other form of covering for the frames may be used. In a crate for poultry, the bottom frame covering would preferably be solid.

While I have herein described a certain specific manner and method of constructing and assembling the elements of my invention, it is understood that I may vary from the same in minor details of construction and material without departing from the spirit of my invention as laid down in the appended claims. For instance, it would be possible to use angle bars of wood instead of iron, though such would be shorter lived.

What I claim to be new and patentable is:

1. A collapsible crate, the frames of which are made of angle iron with the troughs turned inwardly, and comprising equal top and bottom frames, equal side frames slightly shorter than the bottom frame, and approximately half the width of the bottom frame, and equal end frames slightly shorter than the width of the bottom frame but slightly greater in height than the side frames and made of a smaller sized angle iron so that the end frames will rise flush with the side frames when the crate is expanded and may be laid down endwise across the bottom frame and inclosed in the space between the top and bottom frames when the crate is collapsed and so that the side and end frames will fall within the flanges of the top and bottom frames when either expanded or collapsed, the lower horizontal flanges of the side frames being cut away so as to form a hinge strip adjacent the side edges of the bottom frame, and the ends of the upper, horizontal flanges of the side frames being cut away, so as to leave open corners to receive the end frames; hinges connecting the side and bottom frames along said hinge strip; a wire netting as a covering for said frames; ears punched in the flanges of the frames as means for securing said covering thereto; and alined lock-ears with eyes therethrough mounted at the sides of the bottom frame and at the tops of the side frames, slots formed in the sides of the top frame to receive said lock-ears, and cotter pins linked to said top frame and adapted for insertion through the eyes of the lock-ears, as means for locking the elements of the crate in either expanded or collapsed position.

2. A collapsible crate, the frames of which are made of angle iron with the troughs turned inwardly, and comprising equal top and bottom frames, equal side frames slightly shorter than the bottom frame, and approximately half the width of the bottom frame, and equal end frames slightly shorter than the width of the bottom frame, but slightly greater in height than the side frames and made of a smaller sized angle iron so that the end frames will rise flush with the side frames when the crate is expanded and may be laid down endwise across the bottom frame and inclosed in the space between the top and bottom frames when the crate is collapsed, and so that the side and end frames will fall within the flanges of the top and bottom frames when either expanded or collapsed, the lower horizontal flanges of the side frames being cut away so as to form a hinge strip adjacent the side edges of the bottom frame, and the ends of the upper, horizontal flanges of the side frames being cut away, so as to leave open corners to receive the end frames; notches cut in the upper horizontal flanges of the side frames adapted to receive the flanges of the end frames when the crate is collapsed; hinges connecting the side and bottom frames along said hinge strip; a wire netting as a covering for said frames; ears punched in the flanges of the frames as means for securing said covering thereto; and lock-ears mounted at the sides of the bottom frame and alined with complementary lock-ears mounted at the tops of the side frames. slots formed in the sides of the top frame to receive said lock-ears, and means depending between the top frame and said lock-ears for locking the elements of the crate in either expanded or collapsed position.

HIRAM R. DE LAYE.